United States Patent [19]

Frakes

[11] Patent Number: 4,735,567

[45] Date of Patent: Apr. 5, 1988

[54] APPARATUS FOR APPLYING A PREDETERMINED SURFACE EFFECT

[76] Inventor: Raymond J. Frakes, 7600 Mason St., Unit 2, Canoga Park, Calif. 91306

[21] Appl. No.: 892,441

[22] Filed: Aug. 4, 1986

[51] Int. Cl.[4] ........................ B28B 11/08; B29C 59/04

[52] U.S. Cl. ...................................... 425/456; 425/458

[58] Field of Search ............... 425/458, 456, 385, 403, 425/DIG. 235

[56] References Cited

U.S. PATENT DOCUMENTS

| | | | |
|---|---|---|---|
| 370,491 | 9/1887 | Pelletier et al. | 425/458 |
| 3,023,695 | 3/1962 | Kuster | 425/DIG. 235 |
| 4,043,487 | 8/1977 | Price | 425/456 X |
| 4,496,504 | 1/1985 | Steenson et al. | 425/456 X |
| 4,591,291 | 5/1986 | Owens | 425/456 X |
| 4,614,486 | 9/1986 | Bragagnini | 425/456 X |
| 4,639,346 | 1/1987 | Pav et al. | 425/DIG. 235 |

FOREIGN PATENT DOCUMENTS

| | | | |
|---|---|---|---|
| 960023 | 12/1974 | Canada | 425/456 |

*Primary Examiner*—Richard L. Chiesa
*Attorney, Agent, or Firm*—Elliott N. Kramsky

[57] ABSTRACT

Apparatus for applying a predetermined surface effect to a masonry surface. A roller has a predetermined topographical pattern on its outer surface for creating such effect. The roller is mounted within a frame that includes a handle engaged to a yoke-like apparatus. The handle permits a single unskilled operator to finish a relatively large surface area. Vibration apparatus is mounted to the frame and is controllable whereby the operator can control the texture of the effect produced.

13 Claims, 1 Drawing Sheet

FIG. 1
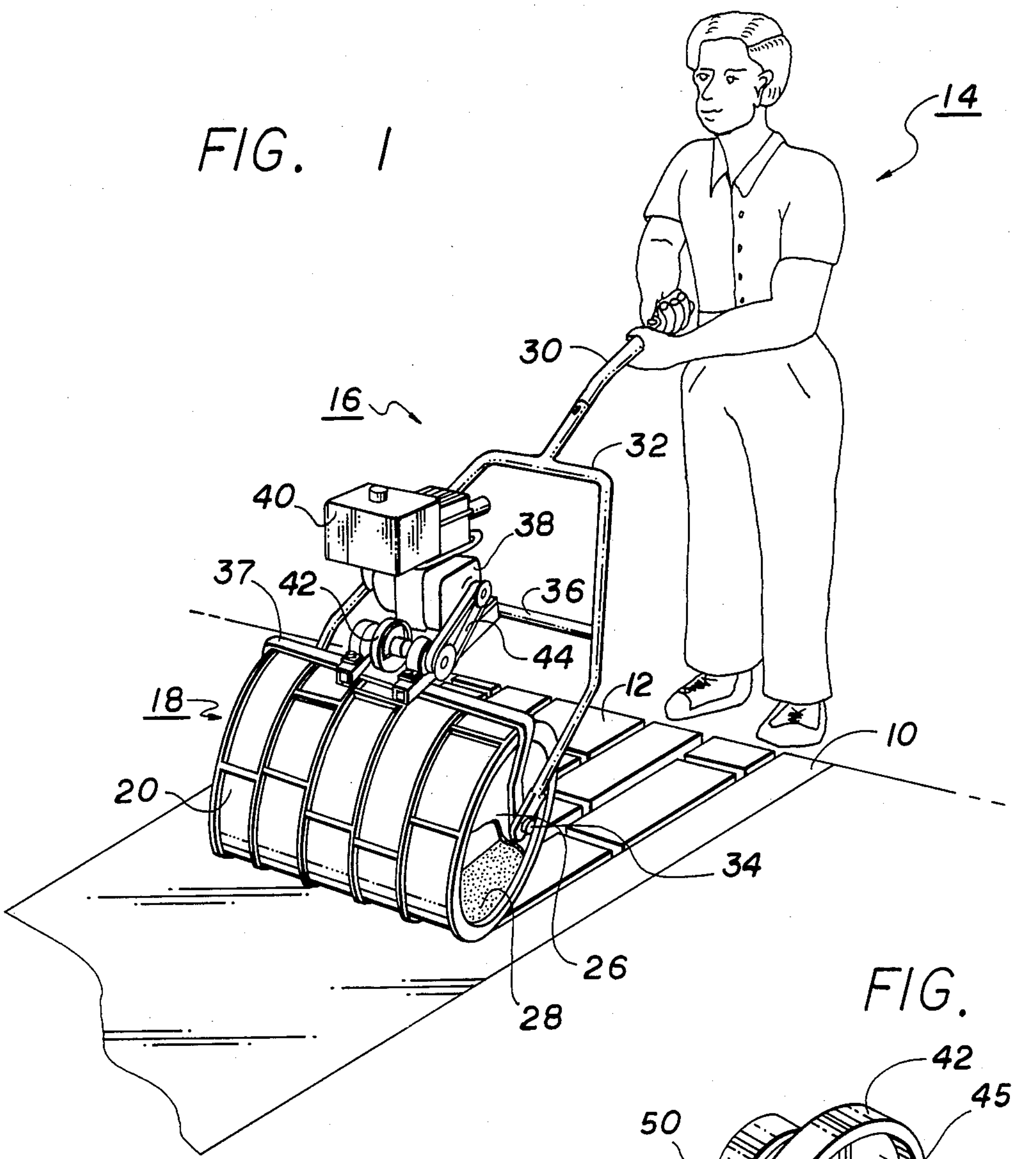
FIG. 2
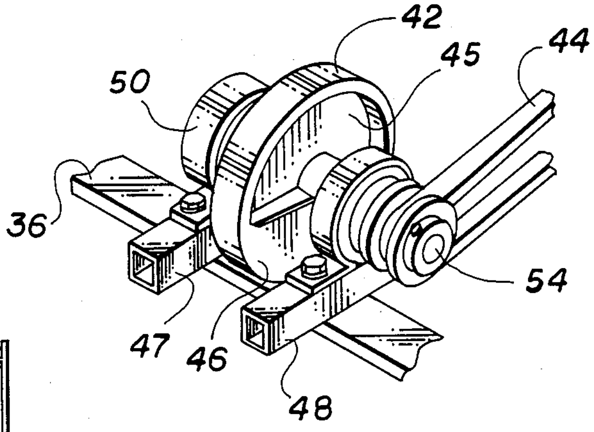
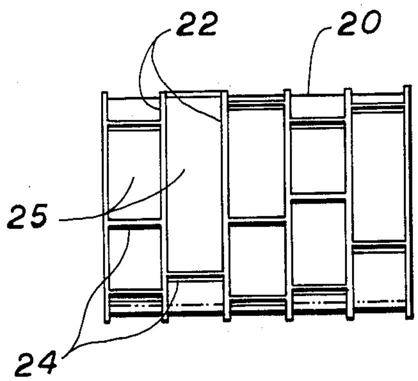
FIG. 3

APPARATUS FOR APPLYING A PREDETERMINED SURFACE EFFECT

BACKGROUND

1. Field of the Invention

The present invention relates to apparatus for use in masonry. More particularly, this invention pertains to a new apparatus for efficiently applying a predetermined effect and texture over a relatively large area.

2. Description of the Prior Art

A number of surface designs or effects are commonly employed to enhance the appearance of mortar or cement. Among these are the "stone tile" and "brick" effects. However, numerous other simulated patterns or effects are commonly employed to enhance the appearance of the masonry.

Presently, two techniques are employed for applying a desired surface appearance to masonry. These are (1) hand sculpting and (2) tamping down of mats. In the first technique, the mason uses a hand tool to "draw" the desired design onto the soft surface while, in the second instance, a large mat is prepared having a predetermined pattern of ridges and the like. This pattern is impressed upon the damp material by carefully laying the mat, face down, over the cement or mortar and then carefully tamping the image into the material with various hand tools.

Both of the above techniques require the input of substantial numbers of skilled man hours and each is therefore relatively slow and expensive. Further, since the surface is drying while the surface effect is being applied, time constraints may require the employment of numerous personnel to finish a large area. Thus, both of these methods are quite subject and sensitive to labor market conditions and available skills.

SUMMARY

The present invention overcomes the foregoing and other shortcomings of the prior art by providing new apparatus for applying a predetermined surface effect. Such apparatus includes a roller comprising a substantially cylindrical wall. The outer surface of the wall includes a predetermined topographical pattern for creating said predetermined surface effect. Finally, means are provided for advancing the roller relative to a surface whereby such topographical pattern is impressed upon the surface.

The preceding features and advantages of this invention will become further apparent from the detailed description that follows. This written description is accompanied by a set of drawing figures wherein numerals point out the various features of the invention, like numerals referring to like features of the invention throughout the figures and the written description.

BRIEF DESCRIPTION OF THE DRAWINGS

FIG. 1 is a perspective view of the invention as adapted for use in finishing a surface;

FIG. 2 is an enlarged perspective view of a portion of the vibration mechanism of the invention; and FIG. 3 is a front elevation view of the outer wall of the roller of the invention.

DESCRIPTION

Turning now to the drawings, FIG. 1 is a perspective view of the invention as adapted for use in finishing a surface 10. The surface 10 may comprise any of a number of common masonry binder compositons, such as cement. The invention is applied to the surface 10 prior to the completion of hardening of the composition so that a predetermined pattern 12 can be impressed thereon. Such a pattern may constitute one of a number of desirable effects such as those known as the stone, tile or brick effects.

Unlike the prior art methods, the pattern 12 may be impressed upon the surface 10 by a single, relatively unskilled operator 14. Thus, substantial economies are realized in the use of the invention. Further, as will be explained, the present invention permits relatively rapid application of the pattern 12, an important factor in view of the fact that the surface 10 is necessarily drying and hardening while the pattern 12 is applied.

The invention comprises a hand-held, roller-type apparatus 16. The apparatus 16 can cover wide areas of the surface 10 in a relatively short period of time to apply a desired, preselected pattern. The invention includes a roller 18 having a substantially cylindrical shape. The outer surface 20 of the roller 18 comprises a preselected pattern or topography of ridges, indentations and surface textures. Such pattern is designed in accordance with the desired pattern 12 for molding or affixing onto the surface 10.

The outer surface of the roller 18 is shown in greater detail in FIG. 3. As can be seen in this view, for one preselected surface pattern, lateral ridges 22 define the side edges of rectangular bricks or tiles while longitudinal ridges 24 define the ends of the bricks or tiles. The longitudinal ridges 24 are staggered about the outer surface of the roller 18 to produce the staggered effect that can be seen in the pattern 12 of FIG. 1. While a relatively "smooth" texture is effected by the pattern shown in FIGS. 1 and 3, the surfaces 25 between the ridges 22 and 24 may be somewhat "rough" to impart a desired micro-effect (i.e. texture) to the surface 10.

The outer surface of the roller 18 may be formed of either metal or elastomeric material. Int he first instance, the desired pattern of ridges, etc. may be cast into an integral roller formed of aluminum or the like. In the latter instance, the pattern may comprise a mat of elastomeric material such as urethane that includes the desired topological pattern which is glued onto the otherwise-smooth (possibly metallic) surface of the roller 18. The pattern may be formed on the elastomeric material by any of a number of molding processes including, for example, casting a two part (resin plus catalyst) elastomeric material over a desired pattern of split stones, bricks or the like. In this way, a very realistic surface effect is achieved.

Returning now to FIG. 1, one can see that a side 26 has been partially broken away to expose the presence of a variable amount of water 28 within the roller 18. The water is added to adjust the weight, and hence the force applied by, the outer surface of the roller 18. The amount of water that is input into the roller 18 is determined in accordance with the hardness of the surface 10, the hardness of the outer surface of the roller 18 and the desired surface effect (i.e. depth of impressions).

A structure is provided that permits a single operator 14 to advance the roller 18 easily over relatively large surfaces and thereby perform a greater amount of work than that which can be accomplished by present day methods. This structure culminates in a handle 30 that can be easily grasped and upon which the operator 14 may push to advance the roller 18 across the surface 10.

The handle 30 is inserted within a yoke-type frame 32, the ends of which terminate at opposed ends of the axis of rotation of the roller 18. means 34 are provided for rotatably engaging each of such opposed ends of the yoke-like frame 32 to the roller 18 whereby the roller rotates, and the surface 20 thereof is advanced over the surface 10 when the operator 14 pushes upon the handle 30. A welded cross member 36 is provided for enhancing the strength of the frame 32. As will be seen below, the cross member 36 additionally serves to support a vibrational apparatus.

In addition to utilizing a preselected topological pattern at the outer surface of the roller 18 and the weight-pressure applied by a volume of water confined therein, the invention provides vibrational apparatus for inducing the masonry material of the surface 10 to be formed into an attractive pattern 12. Such vibrational apparatus is mounted between the cross member 36 and a vibration bar 37 and includes a motor 38 (preferably a 3 h.p. engine having a gasoline tank 40) for driving an eccentrically weighted wheel 42. The shaft of the motor 38 drives the wheel through a connecting belt 44.

Referring now to FIG. 2, an enlarged partial perspective view of the vibrational apparatus, it can be seen that such apparatus is fixed to the vibration bar 37 by means of a support frame comprising a pair of hollow metal tubes 46, 48 of square cross sections. The opposed ends of the tubes are preferably welded to the cross member 36 so that the frame for supporting the vibrational apparatus is substantially rigid and transmits vibrations generated by the eccentrically-weighted wheel 42 to the axis or center of rotation of the roller 18. Such vibration is directly transmitted to such axis of rotation by the opposed ends of the U-shaped vibration bar 37. The opposed ends of the bar 37 are rotatably engaged to the roller 18 at its center of rotation by the same means 34 that engages the ends of the of the yoke-like member 32 thereto.

Referring once again to FIG. 2, the wheel 42 is of a deliberately unbalanced design, including a portion of reduced thickness 45 and a solid portion 46. When rotating, such imbalance causes the wheel 42 to exert uneven inertial forces that cause the structures engaged thereto to vibrate. The wheel, whose rotation is driven by means of the belt 44, is coupled to the supporting frame comprising the tubes 46 and 48 by means of a pair of pillow blocks (including bearings) 50 and 52 that surround its shaft 54.

A throttle is provided adjacent the handle 30 that permits the operator to vary the speed of the motor 38 and, consequently, the speed and degree of vibration induced by the rotating wheel 42 as the roller 18 traverses the surface 10. By providing apparatus for inducing vibration, the present invention allows the operator 14 to achieve a desired "texture" in forming the pattern 12. Further, by increasing the amount of vibration slightly while finishing a surface, the operator can compensate for the gradual hardening of the surface that necessarily occurs during the process. By adding this feature to the invention, the finishing process for a large surface area can be reliably performed by a single operator 14.

As can be seen, a desired pattern 12 is impressed upon a surface 10 by a single operator 14 who may advance the apparatus 16. No particular skill is required to form the desired pattern 12 with the aid of the disclosed apparatus. Further, the teachings of the invention might additionally be employed to finish a vertical surface, such as a wall, by employing a hand held version of the invention.

Thus it is seen that there has been brought to the masonry art new and improved apparatus for applying a predetermined surface effect. By employing apparatus in accordance with this invention one relatively unskilled laborer can perform the work of a number of highly skilled individuals, resulting in substantial economies not found in the prior art.

While this invention has been described with regard to a presently preferred embodiment, its scope is by no means limited thereto. Rather, such scope is only limited insofar as defined by the following set of claims and includes all equivalents thereof.

What is claimed:

1. Apparatus for applying a predetermined surface effect and texture over a relatively large area comprising, on combination:
   - (a) a roller comprising a substantially cylindrical wall that is hollow throughout its entire axial length;
   - (b) the outer surface of said wall including a predetermined topographial pattern for creating said predetermined surface effect;
   - (c) means for advancing said roller with respect to a surface whereby said topographical pattern is impressed upon said surface;
   - (d) said roller including opposed side members for coordinating with said wall to define an enclosed, sealed interior cavity adapted to retain and contain a fluid therein in a liquid-tight manner;
   - (e) means for adjusting selectively the impression of the topographical pattern upon the area to be finished, said means for adjusting being fully encased within said enclosed interior cavity of said roller;
   - (f) means for achieving the desired texture; and
   - (g) means for compensating for the gradual hardening of the surface during the application process.

2. Apparatus as defined in claim 1 wherein said means for advancing further includes:
   - (a) a handle;
   - (b) a yoke-like frame engaged to said handle; and
   - (c) means for rotatably engaging said yoke-like frame to said roller whereby said roller is rotatable about its axis.

3. Apparatus as defined in claim 2 wherein said means for adjusting includes a preselected volume of fluid contained within said roller, said volume of fluid is determined in accordance with the hardness of the surface, the hardness of the outer surface of said roller, and the desired surface effect.

4. Apparatus as defined in claim 3 wherein said means for achieving the desired texture includes means for inducing vibration of said roller.

5. Apparatus as defined in claim 4 wherein said means for inducing vibration further includes:
   - (a) a motor for causing an output shaft to rotate;
   - (b) means for transmitting said rotation to a second shaft; and
   - (c) an eccentrically balanced weight engaged to said second shaft.

6. Apparatus as defined in claim 5 further characterized in that said means for inducing vibration further includes means for transferring said vibration to the axis of rotation of said roller.

7. Apparatus as defined in claim 6 wherein said means for transferring vibration further includes:
   - (a) a support frame for said means for inducing vibration; and (b) said support frame includes a U-shaped members whose opposed ends are rotatably engaged to said roller adjacent said axis of rotation.

8. Apparatus as defined in claim 7 wherein the outer surface of said wall comprises molded elastomeric material.

9. Apparatus as defined in claim 7 wherein the outer surface of said wall comprises metal.

10. Apparatus as defined in claim 9 wherein said means for compensation for the gradual hardening includes a throttle for varying the speed of said motor to control the vibration produced by said means for inducing vibration.

11. Apparatus as defined in claim 10 wherein the topographical pattern includes a plurality of lateral outwardly protruding ridges for defining the side edges of a brick-like substantially rectangular pattern, and a plurality of longitudinal outwardly protruding ridges for defining the ends of the rectangular pattern.

12. Apparatus as defined in claim 11 wherein the surface of said wall defined between said longitudinal and lateral ridges is roughened to impart a desired micro-effect to the texture of said outer surface.

13. Apparatus as defined in claim 1 wherein said means for achieving the desired texture includes means for inducing vibration.

* * * * *